United States Patent
Nagaoka

(10) Patent No.: US 12,319,296 B2
(45) Date of Patent: Jun. 3, 2025

(54) REVERSE TRAVELING DETERMINATION DEVICE

(71) Applicant: TOYOTA JIDOSHA KABUSHIKI KAISHA, Toyota (JP)

(72) Inventor: Kohtaroh Nagaoka, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 297 days.

(21) Appl. No.: 18/107,236

(22) Filed: Feb. 8, 2023

(65) Prior Publication Data

US 2023/0256976 A1 Aug. 17, 2023

(30) Foreign Application Priority Data

Feb. 14, 2022 (JP) ................................ 2022-020243

(51) Int. Cl.
*B60W 40/10* (2012.01)
*B60W 40/02* (2006.01)
*B60W 50/14* (2020.01)

(52) U.S. Cl.
CPC ............ *B60W 40/10* (2013.01); *B60W 40/02* (2013.01); *B60W 50/14* (2013.01); *B60W 2050/143* (2013.01); *B60W 2520/06* (2013.01); *B60W 2554/80* (2020.02)

(58) Field of Classification Search
CPC ...... B60W 40/10; B60W 40/02; B60W 50/14; B60W 2050/143; B60W 2520/06; B60W 2554/80; B60W 2552/05; G08G 1/056
See application file for complete search history.

(56) References Cited

U.S. PATENT DOCUMENTS

| 4,320,380 A | * | 3/1982 | Berard ................. E01F 13/06 |
| | | | 49/49 |
| 8,983,725 B2 | * | 3/2015 | Breu ..................... B60K 35/10 |
| | | | 701/41 |
| 10,759,329 B2 | | 9/2020 | Morimura et al. |
| 10,946,791 B2 | | 3/2021 | Morimura et al. |
| 11,260,789 B2 | | 3/2022 | Morimura et al. |
| 2004/0264209 A1 | * | 12/2004 | Okawa .................. B60Q 1/12 |
| | | | 362/524 |

(Continued)

FOREIGN PATENT DOCUMENTS

| JP | 2006185295 A | * | 7/2006 | ......... G01C 21/3407 |
| JP | 2009-252065 A | | 10/2009 | |

(Continued)

OTHER PUBLICATIONS

Translation of JP 2006185295 A (Year: 2006).*
Translation of JP 2013220804 A (Year: 2013).*

*Primary Examiner* — Russell Frejd
(74) *Attorney, Agent, or Firm* — Dinsmore & Shohl LLP

(57) ABSTRACT

A reverse traveling determination device that performs reverse traveling determination of determining whether a vehicle is traveling in reverse includes a direction indicator determining unit configured to determine whether a direction indicator of the vehicle has been operated. The reverse traveling determination is not performed after a predetermined time has passed or the vehicle has traveled a predetermined distance after the direction indicator determining unit has determined that the direction indicator has been operated.

5 Claims, 6 Drawing Sheets

(56) References Cited

U.S. PATENT DOCUMENTS

| | | | | |
|---|---|---|---|---|
| 2006/0167620 A1* | 7/2006 | Takagi | ............... | G08G 1/161 |
| | | | | 701/519 |
| 2011/0106376 A1* | 5/2011 | Tijerina | ............... | B60Q 1/40 |
| | | | | 701/36 |
| 2013/0282199 A1* | 10/2013 | Koie | ............... | B60W 30/14 |
| | | | | 701/1 |
| 2016/0003630 A1* | 1/2016 | Higuchi | ............... | G08G 1/167 |
| | | | | 701/41 |
| 2016/0343253 A1 | 11/2016 | Imai | | |
| 2019/0147266 A1* | 5/2019 | Aizawa | ............... | B60K 35/28 |
| | | | | 340/576 |
| 2020/0087892 A1* | 3/2020 | Kamiya | ............... | E02F 3/431 |
| 2020/0150702 A1 | 5/2020 | Ueda | | |
| 2020/0199852 A1* | 6/2020 | Hyodo | ............... | E02F 9/2253 |

FOREIGN PATENT DOCUMENTS

| | | | | |
|---|---|---|---|---|
| JP | 2013220804 A | * | 10/2013 | ......... B60R 25/1012 |
| JP | 2015-121952 A | | 7/2015 | |

* cited by examiner

REVERSE TRAVELING DETERMINATION DEVICE

CROSS-REFERENCE TO RELATED APPLICATIONS

This application claims the benefit of priority from Japanese Patent Application No. 2022-020243, filed on Feb. 14, 2022, the entire contents of which are incorporated herein by reference.

TECHNICAL FIELD

The present disclosure relates to a reverse traveling determination device.

BACKGROUND

For example, Japanese Unexamined Patent Publication No. 2015-121952 discloses a reverse traveling determination device that recognizes a sign symbol such as a character or a symbol indicating a road sign from a camera image obtained by capturing a front view or a rear view of a host vehicle and determines whether the host vehicle is traveling in reverse based on a probability of recognition of the sign symbol.

SUMMARY

In the technique, for example, there is concern about erroneous reverse traveling determination of determining that a vehicle is traveling in reverse, for example, by erroneously recognizing a sign symbol. Therefore, the present disclosure provides a reverse traveling determination device that can curb erroneous reverse traveling determination.

According to an aspect of the present disclosure, there is provided a reverse traveling determination device that performs reverse traveling determination of determining whether a vehicle is traveling in reverse, the reverse traveling determination device including a direction indicator determining unit configured to determine whether a direction indicator of the vehicle has been operated, wherein the reverse traveling determination is not performed after a predetermined time has passed or the vehicle has traveled a predetermined distance after the direction indicator determining unit has determined that the direction indicator has been operated.

Reverse traveling of a vehicle often occurs in a situation in which a route change (such as a lane change or a right or left turn) accompanying an operation of a direction indicator has been performed. In this regard, the reverse traveling determination device can perform reverse traveling determination only until a predetermined time elapses or the vehicle travels a predetermined distance after the direction indicator has been operated. Accordingly, it is possible to curb erroneous reverse traveling determination by performing reverse traveling determination in a situation in which reverse traveling often occurs and reducing execution of reverse traveling determination in situations with low necessity.

The reverse traveling determination device according to the aspect of the present disclosure may perform the reverse traveling determination based on an external environment of the vehicle or based on position information of the vehicle and map information. In this case, it is possible to perform reverse traveling determination using the external environment of the vehicle or using the position information of the vehicle and the map information.

In the reverse traveling determination device according to the aspect of the present disclosure, when the direction indicator determining unit determines that the direction indicator has been operated, a determination travel time or a determination travel distance may be reset and the determination travel time may be increased with the elapse of time or the determination travel distance may be increased with traveling of the vehicle. The reverse traveling determination may be performed when the determination travel time or the determination travel distance is less than the predetermined time or a predetermined distance, and the reverse traveling determination may not be performed when the determination travel time or the determination travel distance is equal to or greater than the predetermined time or the predetermined distance. In this case, it is possible to specifically implement curbing erroneous reverse traveling determination.

The reverse traveling determination device according to the aspect of the disclosure may further include a warning unit configured to issue a warning when it is determined in the reverse traveling determination that the vehicle is traveling in reverse. In this case, it is possible to attract attention to reverse traveling of the vehicle using the warning.

According to the aspects of the present disclosure, it is possible to curb erroneous reverse traveling determination.

DETAILED DESCRIPTION

Figure 1:
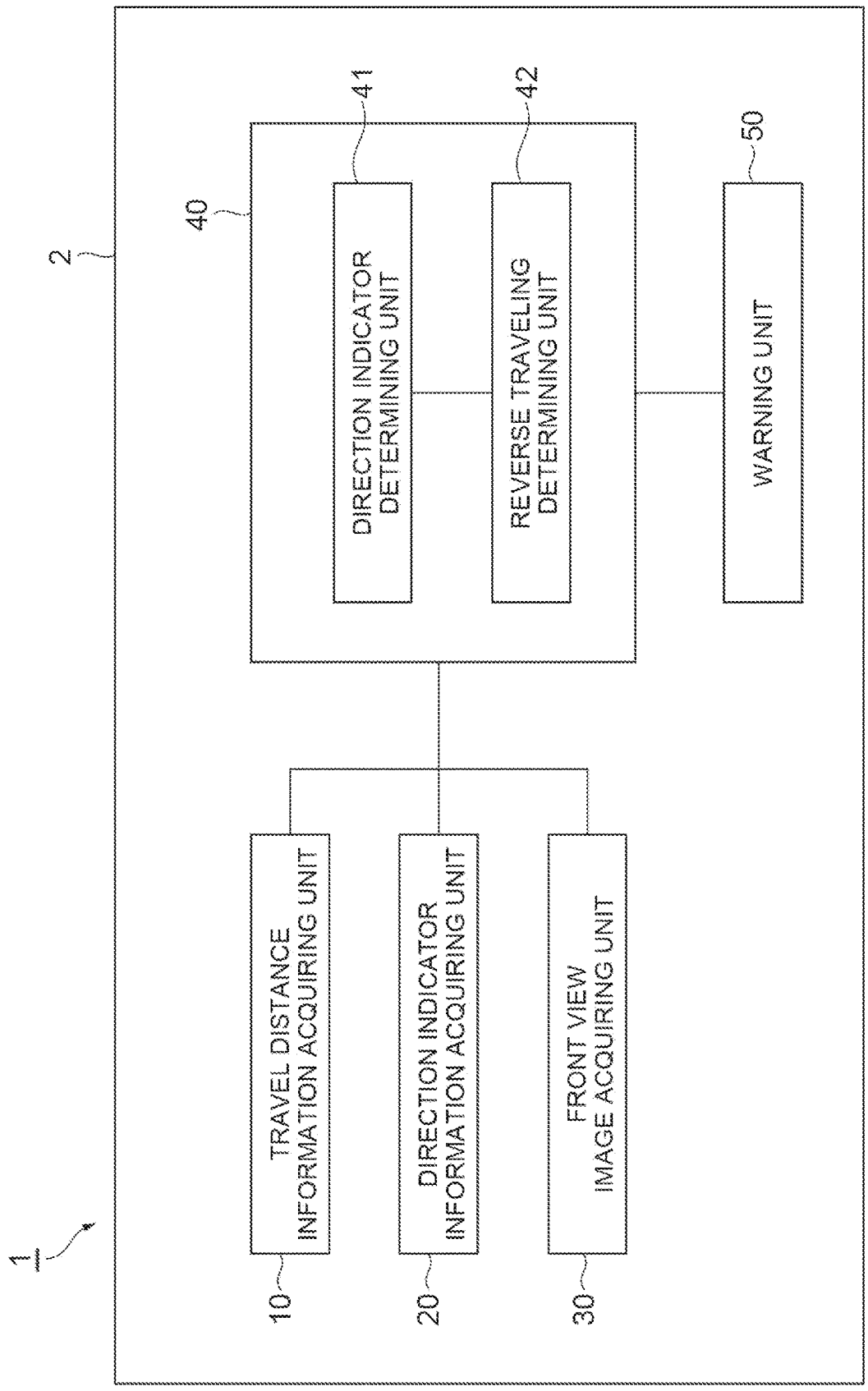
FIG. 1 is a block diagram illustrating a configuration of a reverse traveling determination device according to a first embodiment.

Hereinafter, an exemplary embodiment will be described with reference to the accompanying drawings. In the drawings, the same or corresponding elements will be referred to by the same reference signs and description thereof will not be repeated.

First Embodiment

FIG. 1 is a block diagram illustrating a configuration of a reverse traveling determination device 1 according to a first embodiment. As illustrated in FIG. 1, the reverse traveling determination device 1 is a device that performs reverse traveling determination of determining whether a vehicle 2 is traveling in reverse (hereinafter also simply referred to as "reverse traveling determination"). The vehicle 2 is not particularly limited and may be any of various types of vehicles. Reverse traveling is, for example, traveling in a reverse direction of a predetermined running direction on a road or in a traveling area (such as a parking lot). The reverse traveling determination device 1 is mounted in the vehicle 2. The reverse traveling determination device 1 includes a travel distance information acquiring unit 10, a direction indicator information acquiring unit 20, a front view image acquiring unit 30, an electronic control unit (ECU) 40, and a warning unit 50.

The travel distance information acquiring unit 10 acquires travel distance information which is information on a travel distance of the vehicle 2. The travel distance information acquiring unit 10 includes, for example, a vehicle speed sensor that detects a speed of the vehicle 2. The travel distance information acquiring unit 10 transmits the acquired travel distance information to the ECU 40. The travel distance information acquiring unit 10 is not particularly limited and may employ various types of known sensors.

The direction indicator information acquiring unit 20 acquires direction indicator information which is information indicating that a direction indicator has been operated by a driver of the vehicle 2 (hereinafter simply referred to as a "driver"). The direction indicator information acquiring unit 20 includes, for example, a direction indicator sensor that detects on/off states of right and left direction indicators of the vehicle 2. The direction indicator information acquiring unit 20 transmits the acquired direction indicator information to the ECU 40. The direction indicator information acquiring unit 20 is not particularly limited and may employ various types of known sensors.

The front view image acquiring unit 30 acquires a front view image (an external environment) of the vehicle 2. The front view image acquiring unit 30 includes, for example, a camera that is provided on the outside of a front windshield of the vehicle 2. The front view image acquiring unit 30 transmits the acquired front view image to the ECU 40. The front view image acquiring unit 30 is not particularly limited and may employ various types of known imaging devices.

The ECU 40 is an electronic control unit including a processor such as a central processing unit (CPU) and memories such as a read only memory (ROM) and a random access memory (RAM). In the ECU 40, for example, various functions are implemented by loading a program stored in the ROM into the RAM and causing the CPU to execute the program loaded into the RAM. The ECU 40 may include a plurality of electronic control units. The ECU 40 includes a direction indicator determining unit 41 and a reverse traveling determining unit 42 as functional units.

The direction indicator determining unit 41 determines whether the direction indicator of the vehicle 2 has been operated based on the direction indicator information. Here, the direction indicator determining unit 41 determines whether an operation of starting activation of the direction indicator has been performed by a driver. The reverse traveling determining unit 42 performs reverse traveling determination based on the front view image. The reverse traveling determination is not particularly limited and can be performed using any known method. For example, in reverse traveling determination, a road sign (such as an arrow signboard) and a road marking (such as a road surface arrow) are extracted from the captured image, whether a direction of the road sign is reversed or whether a direction of the road marking is reversed is determined through image processing such as pattern matching, and whether reverse traveling is being performed is determined based on the result of that determination.

In this embodiment, the reverse traveling determining unit 42 does not perform reverse traveling determination when the vehicle 2 has traveled a predetermined distance after the direction indicator determining unit 41 has determined that the direction indicator was operated. The predetermined distance is not particularly limited and may be set in advance, for example, to 1 km to 2 km.

Specifically, when the direction indicator determining unit 41 determines that the direction indicator has been operated, the reverse traveling determining unit 42 resets a determination travel distance and sets the determination travel distance to 0. The determination travel distance is a travel distance for determining whether to perform reverse traveling determination or not (not to perform reverse traveling determination). The reverse traveling determining unit 42 increases the determination travel distance (that is, adds a travel distance after the determination travel distance has been reset to the determination travel distance using the travel distance information) with traveling of the vehicle 2. The reverse traveling determining unit 42 performs reverse traveling determination when the determination travel distance is less than a predetermined distance, and does not perform (that is, stops) reverse traveling determination when the determination travel distance is equal to or greater than the predetermined distance.

The warning unit 50 issues a warning using at least one of sound and display when it is determined in the reverse traveling determination of the reverse traveling determining unit 42 that the vehicle 2 is traveling in reverse. A human-machine interface (HMI) which is an interface for receiving and outputting information from and to an occupant (including a driver) of the vehicle 2 can be used as the warning unit 50.

Figure 2:
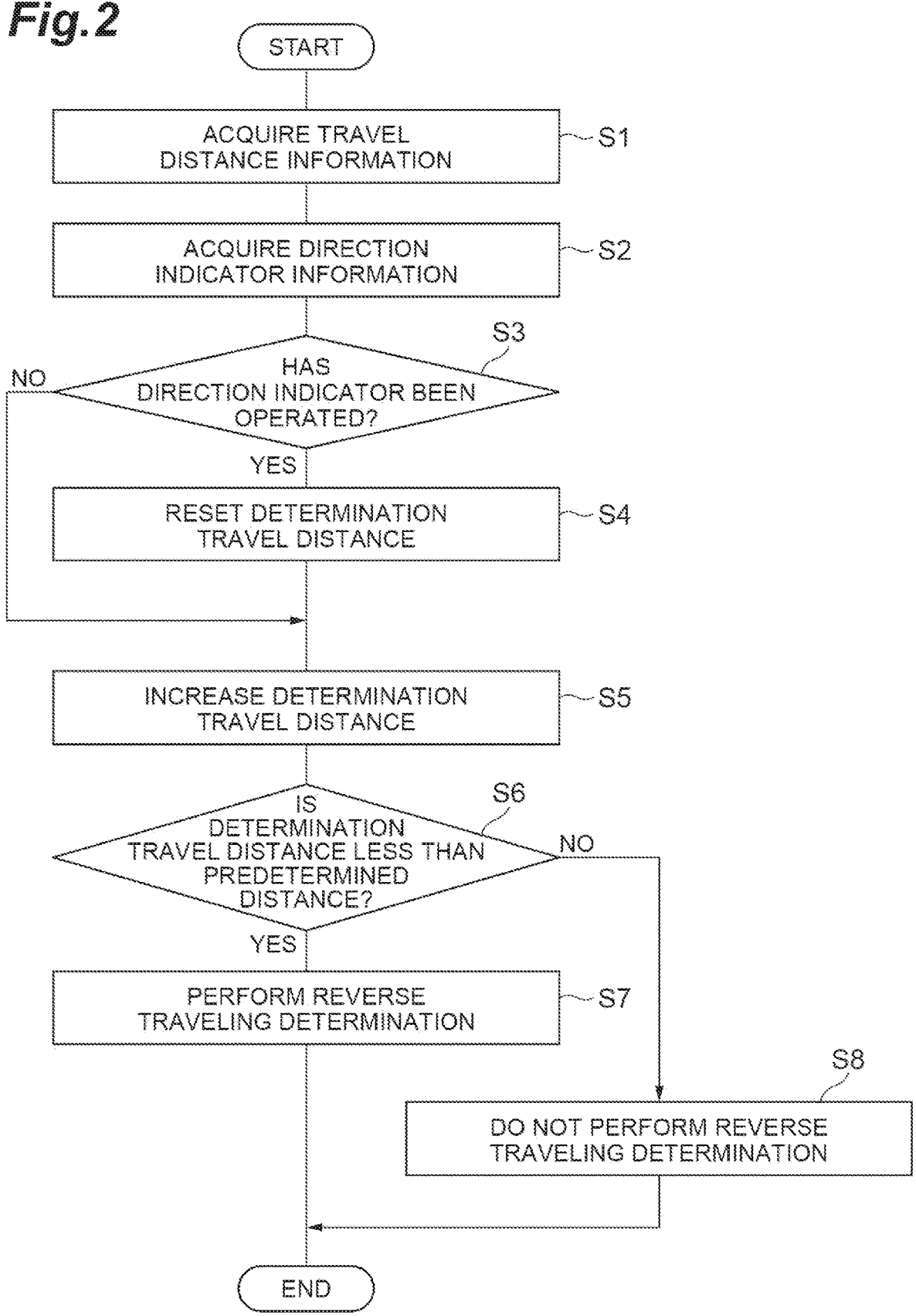
FIG. 2 is a flowchart illustrating an example of a routine which is performed by the reverse traveling determination device illustrated in FIG. 1.

An example of a routine which is performed by the reverse traveling determination device 1 will be described below with reference to the flowchart illustrated in FIG. 2.

For example, when the vehicle 2 starts its traveling or when a driver performs an operation of activating the reverse traveling determination device 1, the reverse traveling determination device 1 periodically performs the following routine. That is, first, the travel distance information acquiring unit 10 acquires travel distance information (Step S1). The direction indicator information acquiring unit 20 acquires direction indicator information (Step S2).

The direction indicator determining unit 41 determines whether a driver has operated the direction indicator based on direction indicator information (Step S3). In Step S3, whether a driver has operated the direction indicator between a previous cycle and the current cycle is determined. When the determination result of Step S3 is YES, the determination travel distance is reset (Step S4). When the determination result of Step S3 is NO or after the process of Step S4 has been performed, a travel distance which the vehicle 2 travels between the previous cycle to the current cycle based on the travel distance information is added to the determination travel distance (Step S5). In a first cycle, in Steps S3 and S5, a process start time may be used as a reference instead of the previous cycle.

The reverse traveling determining unit 42 determines whether the determination travel distance is less than a predetermined distance (Step S6). When the determination result of Step S6 is YES, the reverse traveling determining unit 42 performs reverse traveling determination (Step S7). On the other hand, when the determination result of Step S6 is NO, the reverse traveling determining unit 42 does not perform reverse traveling determination (Step S8). After Step S7 or S8, the current cycle of the routine ends and the routine proceeds to Step S1 of a next cycle.

As described above, the reverse traveling determination device 1 can perform reverse traveling determination only until the vehicle 2 travels the predetermined distance after the direction indicator has been operated. Reverse traveling of the vehicle 2 often occurs in a situation in which the vehicle 2 has performed a route change (such as a lane change or a right or left turn) with the operation of the direction indicator. Accordingly, with the reverse traveling determination device 1, it is possible to curb erroneous reverse traveling determination by performing reverse traveling determination in a situation in which reverse traveling often occurs and reducing execution of reverse traveling determination in a situation with low necessity.

The reverse traveling determination device 1 can cope with, for example, a situation in which the vehicle travels in reverse on a motorway (reverse traveling determination of the following patterns (1) to (5)). Since a route change from a traveling route to another route is necessarily performed in the following patterns (1) to (5), reverse traveling determination can be performed with an operation of the direction indicator as a trigger. The reverse traveling determination device 1 can also cope with a situation at an exit of a parking lot (for example, a situation in which one side is a two-lane road and reverse traveling occurs by turning to right) in which vehicles often travel in reverse in a regular road.

(1) A pattern in which a vehicle enters a motorway through an exit thereof.
(2) A pattern in which a vehicle exits a parking area or a service area through an entrance thereof.
(3) A pattern in which a vehicle exits a parking area or a service area and turns to right at a junction point.
(4) A pattern in which a vehicle enters a motorway through a tollgate and turns to right at a junction point.
(5) A pattern in which a vehicle enters a motorway through a tollgate or through an opposite exit.

In pattern (2), a case in which a parking lot is full and a driver misunderstands an exit is considered. In consideration of the area of a parking lot in a largest service area, it is also possible to cope with a parking lot of a largest service area by setting the predetermined distance to 1 km to 2 km.

The reverse traveling determination device 1 performs reverse traveling determination based on a front view image of the vehicle 2. In this case, it is possible to perform reverse traveling determination using a front view image of the vehicle 2. This embodiment is not limited to a configuration in which the reverse traveling determination device 1 includes the front view image acquiring unit 30, but the reverse traveling determination device 1 has only to include a device that acquires an external environment of the vehicle 2 instead. In this case, it is possible to perform reverse traveling determination using a known method based on the external environment of the vehicle 2.

When the direction indicator determining unit 41 determines that the direction indicator has been operated, the reverse traveling determination device 1 resets the determination travel distance and increases the determination travel distance with traveling of the vehicle 2, performs reverse traveling determination when the determination travel distance is less than the predetermined distance, and does not perform reverse traveling determination when the determination travel distance is equal to or greater than the predetermined distance. In this case, it is possible to specifically implement curbing of erroneous reverse traveling determination.

The reverse traveling determination device 1 includes the warning unit 50 that issues a warning when it is determined through reverse traveling determination that the vehicle 2 is traveling in reverse. In this case, it is possible to attract attention to reverse traveling of the vehicle 2 using the warning.

Second Embodiment

Figure 3:
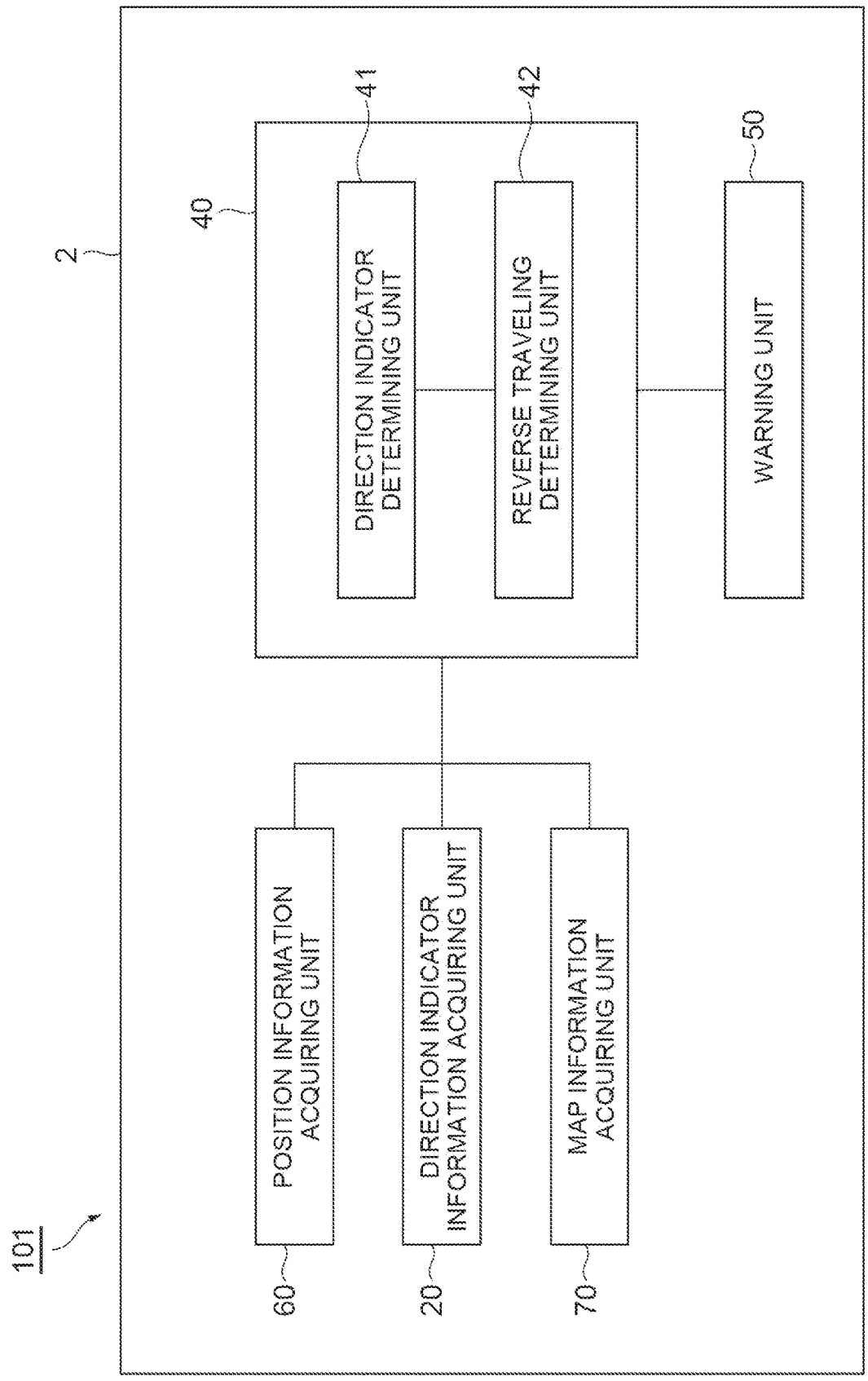
FIG. 3 is a block diagram illustrating a configuration of a reverse traveling determination device according to a second embodiment.

A second embodiment will be described below. Differences of this embodiment from the first embodiment will be described below and repeated description will be omitted. FIG. 3 is a diagram illustrating a reverse traveling determination device 101 according to the second embodiment. As illustrated in FIG. 3, the second embodiment is different from the first embodiment in that the reverse traveling determination device 101 includes a position information acquiring unit 60 and a map information acquiring unit 70 instead of the travel distance information acquiring unit 10 and the front view image acquiring unit 30 (see FIG. 1).

The position information acquiring unit 60 acquires position information on a current position of the vehicle 2. The position information acquiring unit 60 includes, for example, a global positioning system (GPS) receiver. The GPS receiver measures the position of the vehicle 2 (for example, latitude and longitude of the vehicle 2) by receiving signals from three or more GPS satellites. The position information acquiring unit 60 transmits the acquired position information to the ECU 40. The position information acquiring unit 60 is not particularly limited and may employ various types of known devices.

The map information acquiring unit 70 acquires map information. The map information includes position information of roads and travel areas, predetermined running directions and road shape information (for example, curvature information) in the roads and the travel areas, and position information of crossings and junctions. The map information may include traffic regulation information such as a legal speed limit correlated with the position information. The map information may include target information. Targets include lane markings of roads, traffic signals, guard rails, road signs, and road markings. The map information acquiring unit 70 includes, for example, a map database that stores the map information. The map database may be provided in a storage device such as an HDD mounted in the vehicle 2 or may be provided in a server that can communicate with the vehicle 2.

The reverse traveling determining unit 42 according to this embodiment performs reverse traveling determination based on the position information and the map information. For example, in reverse traveling determination, it is determined based on the position information and the map information that the vehicle 2 is traveling in a parking area or a service area and in what direction the vehicle 2 is traveling, and it is determined that the vehicle 2 is traveling in reverse when the vehicle 2 is traveling in a reverse direction of the predetermined running direction. For example, in reverse traveling determination, a current traveling direction of the vehicle 2 is acquired based on change of the position information, the predetermined running direction of a road at which the vehicle 2 is located is acquired based on the map information, and whether the vehicle 2 is traveling in reverse is determined based on the acquired traveling direction and the predetermined running direction. In this embodiment, the reverse traveling determining unit 42 increases the determination travel distance with traveling of the vehicle 2 (that is, adds the travel distance acquired based on the change of the position information after the determination travel distance has been reset to the determination travel distance).

Figure 4:
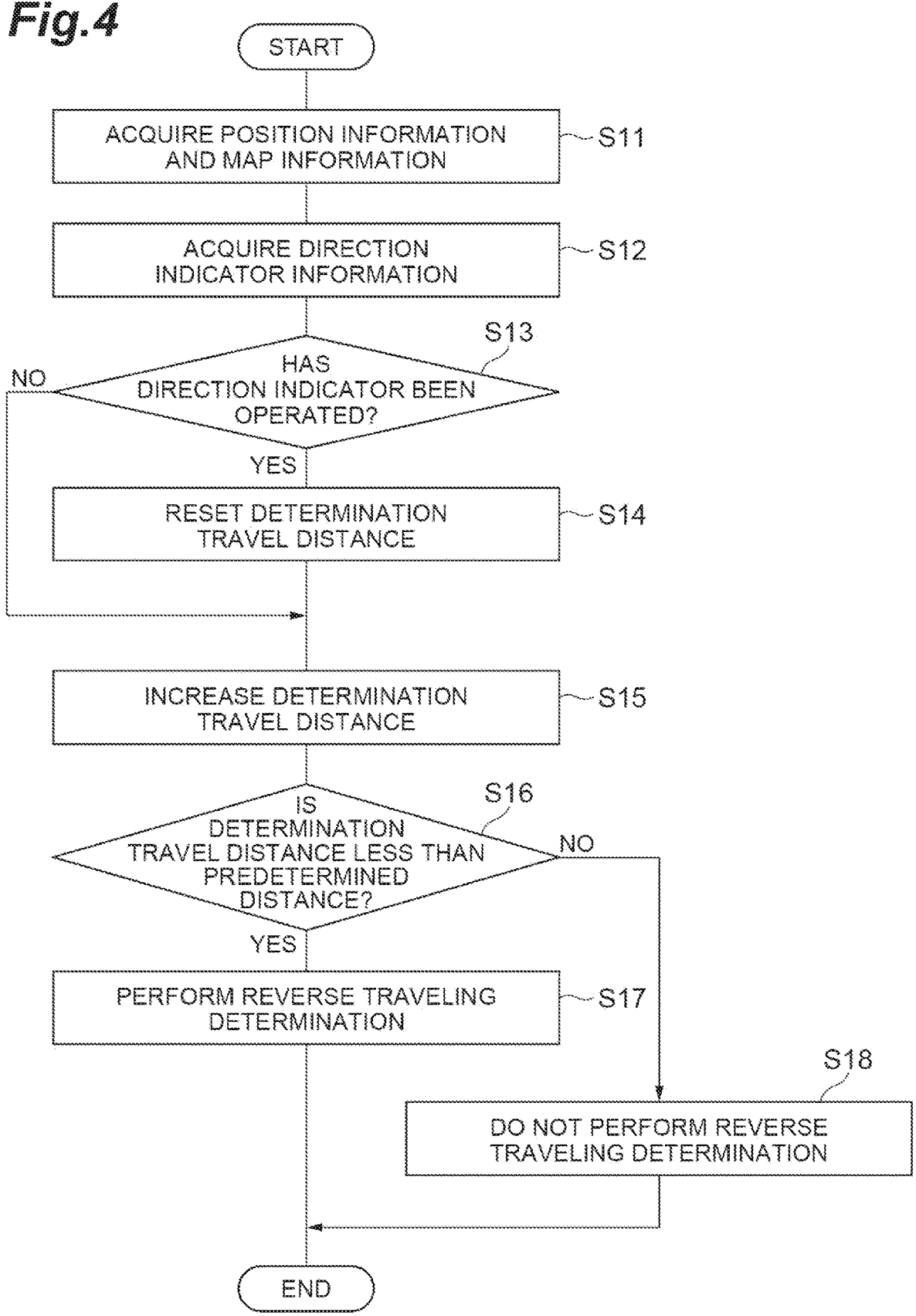
FIG. 4 is a flowchart illustrating an example of a routine which is performed by the reverse traveling determination device illustrated in FIG. 3.

An example of a routine which is performed by the reverse traveling determination device 101 will be described below with reference to the flowchart illustrated in FIG. 4.

In the reverse traveling determination device 101, first, the position information acquiring unit 60 acquires position information and the map information acquiring unit 70 acquires map information (Step S11). The direction indicator information acquiring unit 20 acquires direction indicator information (Step S12). The direction indicator determining unit 41 determines whether a driver has operated the direction indicator based on direction indicator information (Step S13). In Step S13, whether a driver has operated the direction indicator between a previous cycle and the current cycle is determined.

When the determination result of Step S13 is YES, the determination travel distance is reset (Step S14). When the determination result of Step S13 is NO or after the process of Step S14 has been performed, a travel distance corresponding to change of the position information between the previous cycle to the current cycle is added to the determination travel distance (Step S15). In a first cycle, in Steps S13 and S15, a process start time may be used as a reference instead of the previous cycle.

The reverse traveling determining unit 42 determines whether the determination travel distance is less than a predetermined distance (Step S16). When the determination result of Step S16 is YES, the reverse traveling determining unit 42 performs reverse traveling determination (Step S17). On the other hand, when the determination result of Step S16 is NO, the reverse traveling determining unit 42 does not perform reverse traveling determination (Step S18). After Step S17 or S18 has been performed, the current cycle of the routine ends and the routine proceeds to Step S11 of a next cycle.

As described above, the reverse traveling determination device 101 can also achieve the same effects as in the aforementioned effects, that is, effects of curbing erroneous reverse traveling determination by performing reverse traveling determination in a situation in which reverse traveling often occurs and reducing execution of reverse traveling determination in a situation with low necessity. For example, it is possible to curb erroneous reverse traveling determination based on misunderstanding of the running direction due to low precision of the position information at a low vehicle speed.

The reverse traveling determination device 101 performs reverse traveling determination based on the position information of the vehicle 2 and the map information. In this case, it is possible to perform reverse traveling determination using the position information of the vehicle 2 and the map information.

Third Embodiment

Figure 5:
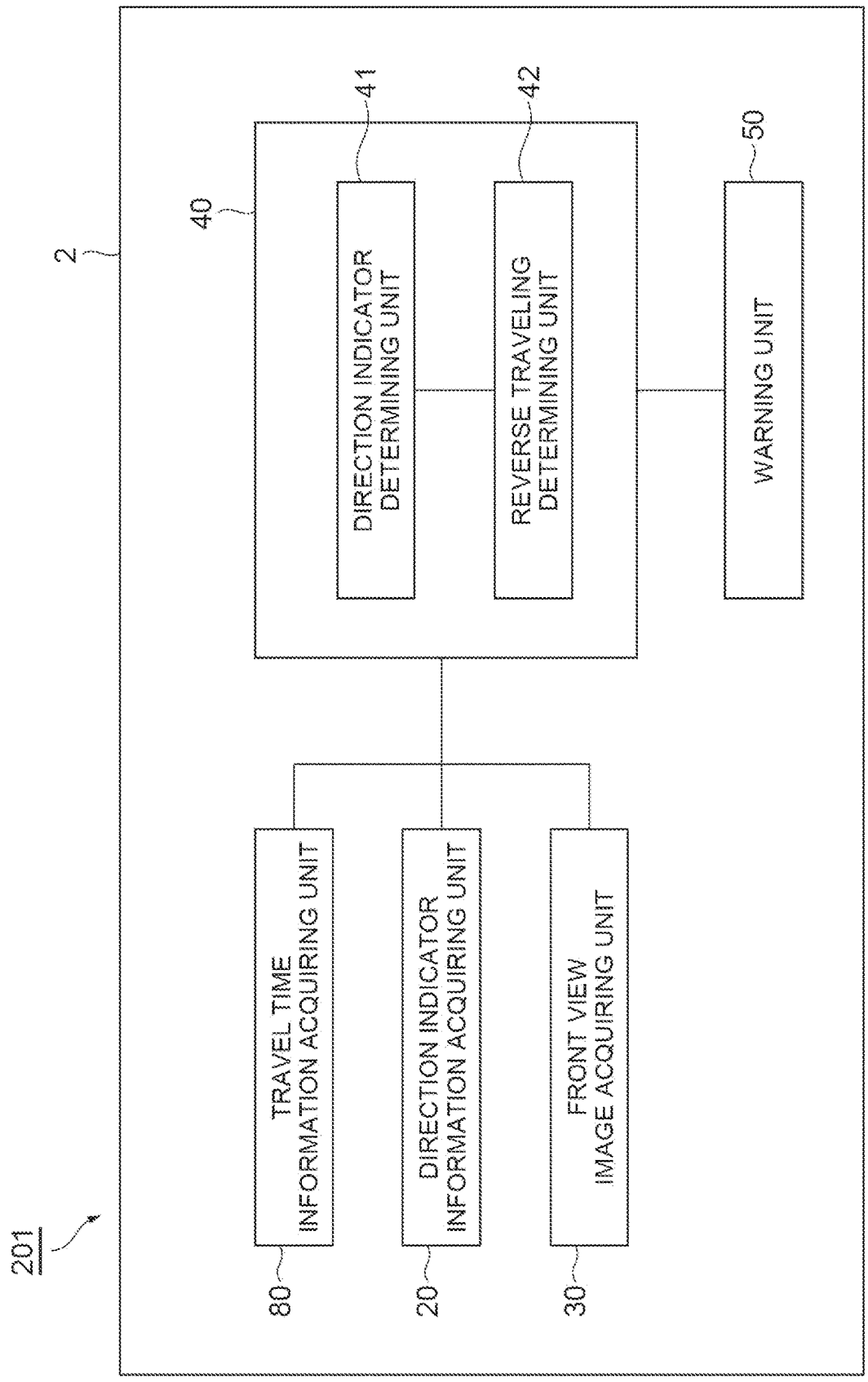
FIG. 5 is a block diagram illustrating a configuration of a reverse traveling determination device according to a third embodiment.

A third embodiment will be described below. Differences of this embodiment from the first embodiment will be described below and repeated description will be omitted. FIG. 5 is a diagram illustrating a reverse traveling determination device 201 according to the third embodiment. As illustrated in FIG. 5, the third embodiment is different from the first embodiment in that the reverse traveling determination device 201 includes a travel time information acquiring unit 80 instead of the travel distance information acquiring unit 10 (see FIG. 1).

The travel time information acquiring unit 80 acquires travel time information which is information on a travel time of the vehicle 2 by measuring the travel time. The travel time information acquiring unit 80 transmits the acquired travel time information to the ECU 40. The travel time information acquiring unit 80 is not particularly limited and may employ various known elements. The travel time information acquiring unit 80 may be constituted by, for example, the ECU 40.

In this embodiment, the reverse traveling determining unit 42 does not perform reverse traveling determination when a predetermined time elapses after the direction indicator determining unit 41 has determined that the direction indicator was operated. The predetermined time is not particularly limited and may be set in advance. Specifically, when the direction indicator determining unit 41 determines that the direction indicator has been operated, the reverse traveling determining unit 42 resets a determination travel time and sets the determination travel time to 0. The determination travel time is a travel time for determining whether to perform reverse traveling determination or not. The reverse traveling determining unit 42 increases the determination travel time with traveling of the vehicle 2 (that is, adds a travel time in which the vehicle travels after the determination travel time has been reset to the determination travel time using the travel time information). The reverse traveling determining unit 42 performs reverse traveling determination when the determination travel time is less than the predetermined time, and does not perform reverse traveling determination when the determination travel time is equal to or greater than the predetermined time.

Figure 6:
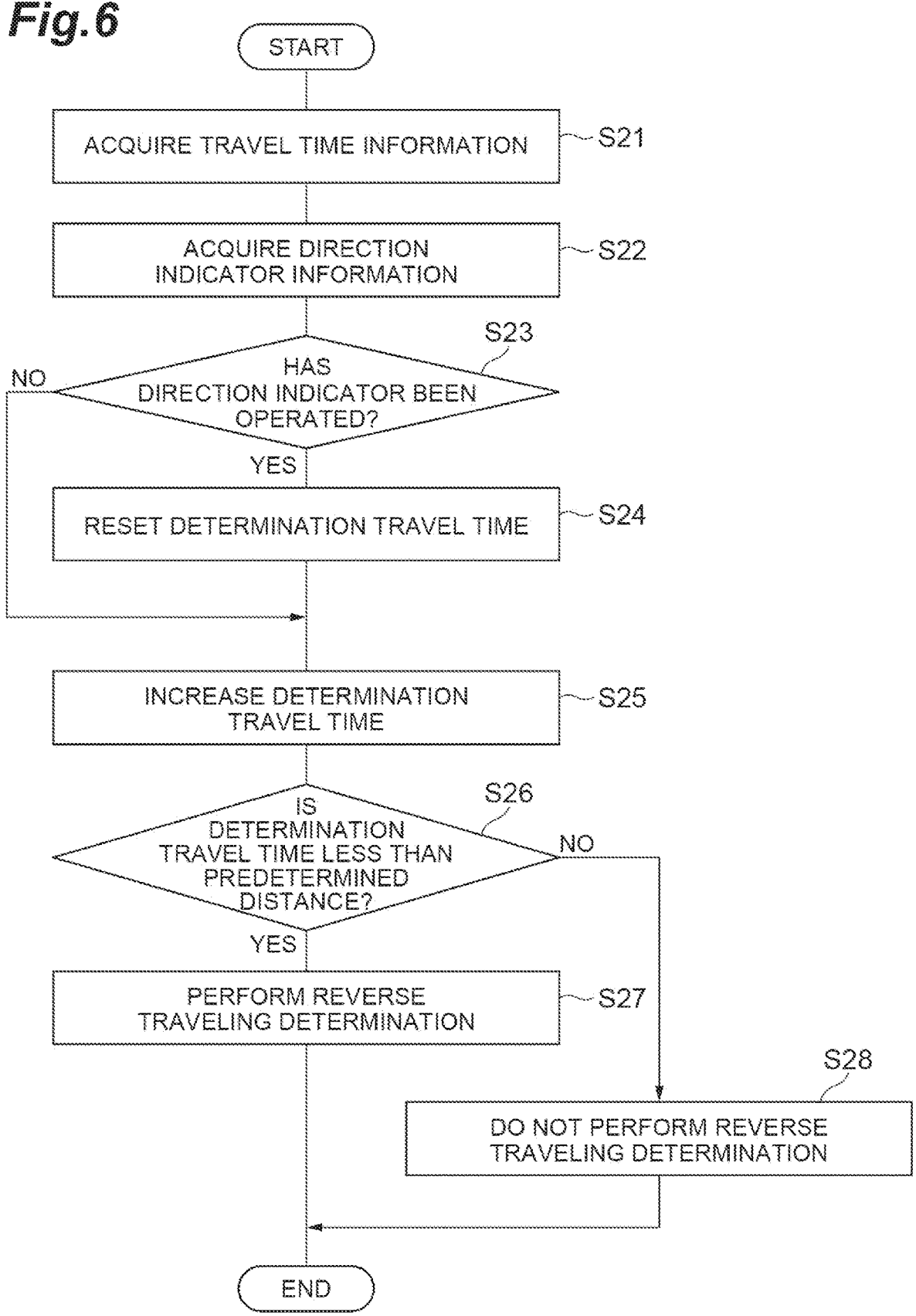
FIG. 6 is a flowchart illustrating an example of a routine which is performed by the reverse traveling determination device illustrated in FIG. 5.

An example of a routine which is performed by the reverse traveling determination device 201 will be described below with reference to the flowchart illustrated in FIG. 6.

In the reverse traveling determination device 201, first, the travel time information acquiring unit 80 acquires travel time information (Step S21). The direction indicator information acquiring unit 20 acquires direction indicator information (Step S22). The direction indicator determining unit 41 determines whether a driver has operated the direction indicator based on the direction indicator information (Step S23). In Step S23, whether a driver has operated the direction indicator between a previous cycle and the current cycle is determined.

When the determination result of Step S23 is YES, the determination travel time is reset (Step S24). When the determination result of Step S23 is NO or after the process of Step S24 has been performed, a travel time of the vehicle 2 which elapses between the previous cycle to the current cycle based on the travel time information is added to the determination travel time (Step S25). In a first cycle, in Steps S23 and S25, a process start time may be used as a reference instead of the previous cycle.

The reverse traveling determining unit 42 determines whether the determination travel time is less than a predetermined time (Step S26). When the determination result of Step S26 is YES, the reverse traveling determining unit 42 performs reverse traveling determination (Step S27). On the other hand, when the determination result of Step S26 is NO, the reverse traveling determining unit 42 does not perform reverse traveling determination (Step S28). After Step S27 or S28, the current cycle of the routine ends and the routine proceeds to Step S21 of a next cycle.

As described above, the reverse traveling determination device 201 can perform reverse traveling determination only until the predetermined time elapses after the direction indicator has been operated. Reverse traveling of the vehicle 2 often occurs in a situation in which the vehicle 2 has performed a route change with the operation of the direction indicator. Accordingly, with the reverse traveling determination device 201, it is possible to curb erroneous reverse traveling determination by performing reverse traveling determination in a situation in which reverse traveling often occurs and reducing execution of reverse traveling determination in a situation with low necessity.

When the direction indicator determining unit 41 determines that the direction indicator has been operated, the reverse traveling determination device 201 resets the determination travel time and increases the determination travel time with traveling of the vehicle 2, performs reverse traveling determination when the determination travel time is less than the predetermined time, and does not perform reverse traveling determination when the determination travel time is equal to or greater than the predetermined time. In this case, it is possible to specifically implement curbing of erroneous reverse traveling determination.

While embodiments of the present disclosure have been described above, the present disclosure is not limited to the embodiments. Some functions of the ECU 40 may be performed by an external server. The configurations in the embodiments or the modified examples can be arbitrarily applied to configurations in other embodiments or other modified examples. Some of the configurations in the embodiments or the modified examples can be appropriately omitted without departing from the gist of the aspects of the present disclosure. The present disclosure is also applicable during manual operation in vehicles that can be switched between autonomous driving and manual operation.

What is claimed is:

1. A reverse traveling determination device that performs reverse traveling determination of determining whether a vehicle is traveling in reverse, the reverse traveling determination device comprising a direction indicator determining unit configured to:
   determine whether a direction indicator of the vehicle has been operated,
   upon determination that the direction indicator has been operated, reset a determination travel distance, and
   upon determination that the direction indicator has not been operated:
     add a distance traveled by the vehicle since a last time that it was determined whether the direction indicator of the vehicle has been operated to the determination travel distance,
     determine whether the determination travel distance is less than a predetermined threshold, and
     upon determination that the determination travel distance is less than the predetermined threshold, determine whether the vehicle is traveling in reverse.

2. The reverse traveling determination device according to claim 1, wherein the reverse traveling determination is performed based on an external environment of the vehicle or based on position information of the vehicle and map information.

3. The reverse traveling determination device according to claim 1, further comprising a warning unit configured to issue a warning when it is determined in the reverse traveling determination that the vehicle is traveling in reverse.

4. The reverse traveling determination device according to claim 1, wherein it is determined whether the vehicle is traveling on a motorway in reverse.

5. The reverse traveling determination device according to claim 1, wherein it is determined whether the vehicle is traveling in a parking lot in reverse.

* * * * *